Aug. 11, 1964  J. J. SULLIVAN  3,144,114
AUTOMOBILE PARKING METER
Filed July 13, 1961  6 Sheets-Sheet 3

INVENTOR.
John J. Sullivan
BY
AGENT though the invention has special utility and advantages in conjunction with a coin mechanism.

United States Patent Office 3,144,114
Patented Aug. 11, 1964

3,144,114
AUTOMOBILE PARKING METER
John J. Sullivan, 3920 Granby St., Norfolk 4, Va.
Filed July 13, 1961, Ser. No. 123,826
9 Claims. (Cl. 194—84)

This invention relates to automobile parking meters, and more particularly to devices of this type which comprise coin-controlled barriers such as were adaptable for use in automobile parking lots.

The invention concerns improvements in, and a simplification of, the parking device of my copending application Serial No. 29,709, filed May 17, 1960, and entitled Mechanical Parking Attendant.

In this copending application I disclose a combination parking meter and car retainer mechanism adaptable for use at a single or individual car stall, or parking area, wherein solely the front left wheel of the automobile is involved, such wheel functioning to actuate the locking and trip elements of the parking device as the front of the car reaches the front area of the stall or individual parking space. The front car wheel is thereafter blocked, in consequence of placing the car in the parking area, and may only be released by payment of the prescribed parking fee and actuation of a manual member, such as a handle on the parking meter. Thus, the device of this copending application is suitable for individual parking stalls or areas, and as a consequence for any given parking lot a number of such meter devices must be provided, corresponding to the capacity of the lot, that is, to the number of individual parking areas contained therein.

By the present invention there is provided a novel and improved coin-controlled or coin-operated parking device which is specifically not intended for use at individual stalls or areas but instead only at the outlets or exits of a parking area. Thus, only one such device is needed for each parking lot exit, regardless of the number of individual parking areas of the lot.

Further, the device of the present invention has utility not only in connection with parking areas where it is to be associated with the exits or outgoing driveways of such areas, but also in connection with the exits of toll highways, bridges, or other driving areas. The invention is, however, illustrated herein in connection with a parking area or parking lot, this being only by way of example.

The device of the present invention is shown as being operative upon payment of a prescribed fixed fee or sum for the parking or driving privilege, this being the same at the exit under consideration for all of the cars of the parking lot or driving area, regardless of the time spent or distance travelled. However, the particular novel mechanism and concept are not limited to the payment of only a fixed fee or sum, but instead portions of the improvements have utility wtihout regard to the amount of the fee and without regard to the use of coin-operated equipment, although the invention has special utility and advantages in conjunction with a coin mechanism.

An object of the present invention is to provide a novel and improved barrier device for the exits of a parking or driving area, which device will greatly facilitate and simplify the payment of fees or tolls, either at attended or else unattended locations.

Another object of the invention is to provide an improved barrier device as above set forth, which is actuated by both the front and rear wheels of the vehicle passing out of the area.

A further object of the invention is to provide an improved automobile barrier device as above outlined, which is especially adaptable to coin operation.

Yet another object of the invention is to provide a coin-controlled barrier device as above characterized, which is simple in its construction, involving relatively few components, and which is relatively small in size and characterized by a desirable compactness.

A still further object of the invention is to provide an improved coin-controlled barrier device as outlined, which is economical to construct and fabricate, resulting in a saving of outlay or investment.

A still further object of the invention is to provide a novel combination of parking area, inlet and outlet passages or driveways, and backcheck and barrier devices associated respectively with such driveways, the barrier devices being preferably coin-controlled, to the end that vehicles may readily enter the parking area, but in order to leave will be required to make payment of a stipulated fee or amount, as by coin.

An additional object of the invention is to provide an improved barrier device in accordance with the foregoing, which is sturdy and reliable in its operation and not likely to easily get out of order or require servicing.

A feature of the invention resides in the provision of an improved barrier device as above outlined, wherein the releasing operation may be easily understood even by an uninstructed or uninformed person, and wherein the operation is foolproof to the maximum possible extent.

Other features and advantages will hereinafter appear.

In the drawings accompanying this specification, similar characters of reference are used to designate like components throughout the several views, in which.

Figure 1:
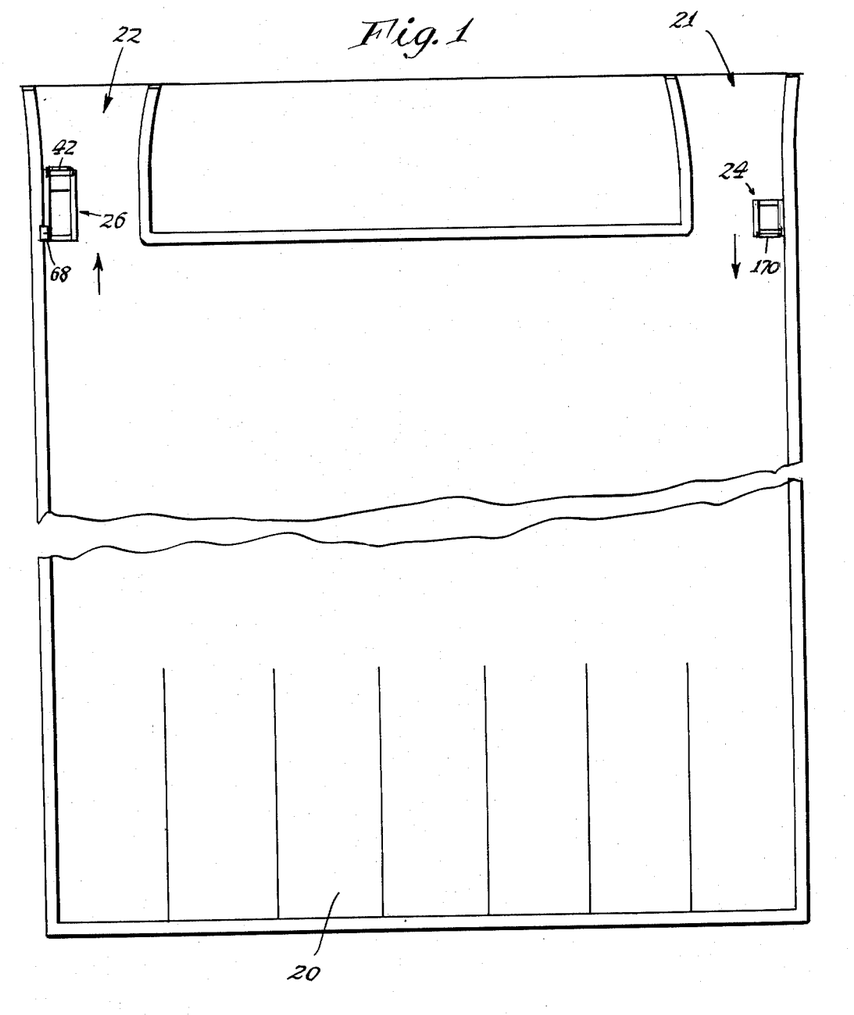
FIG. 1 is a top plan view of a parking area for automobiles, embodying the invention, said area being shown as having a single inlet passage and a single outlet passage equipped wtih the backcheck and barrier devices respectively.

Referring first to FIG. 1 there is shown a parking area 20 which may be, for example, a city lot or the like, having an inlet driveway 21 and an outlet driveway 22, such parking area being provided with the backcheck and vehicle barrier devices of the invention. The backcheck device is indicated by the numeral 24, being disposed at the inlet driveway, and the coin-controlled barrier device located at the outlet driveway is indicated by the numeral 26. By such arrangement, it is possible for vehicles to freely enter the parking area 20 via the inlet driveway 21, whereas such vehicles must be authorized to leave, as by paying a coin at the coin-controlled barrier 26. In each instance (that is, when the vehicle is entering or leaving) the control of the movements of the vehicle involves its wheels, preferably the left front and rear wheels, both in the case of an entering vehicle and also in the case of a departing vehicle.

Figure 2:
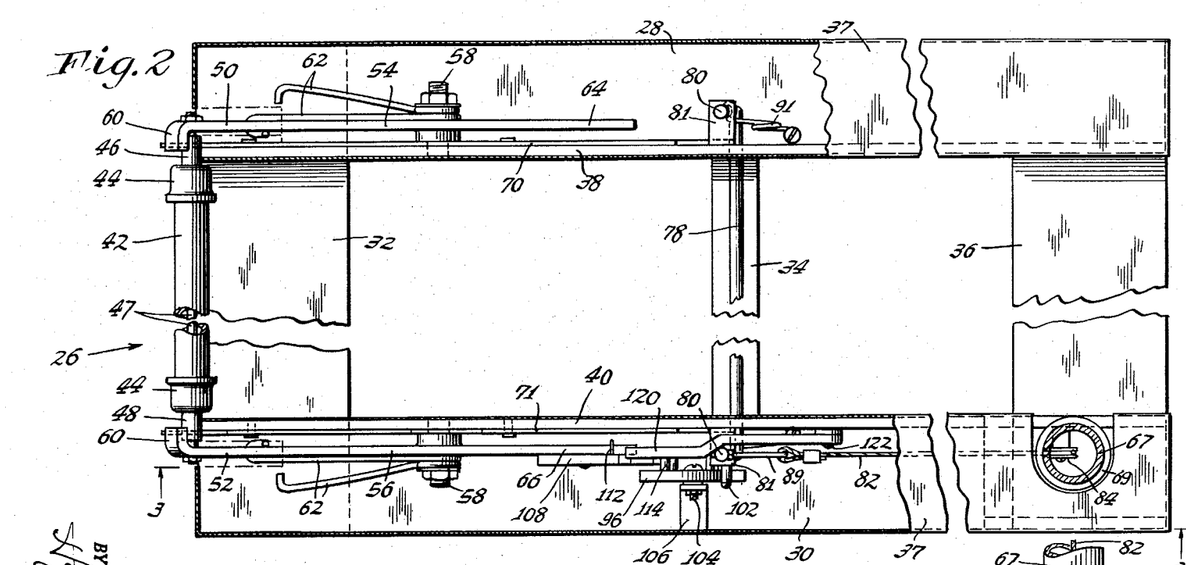
FIG. 2 is a top compressed plan view of the coin-controlled barrier device provided by the invention, with connector portions omitted for the sake of clarity of illustration.
Figure 3:
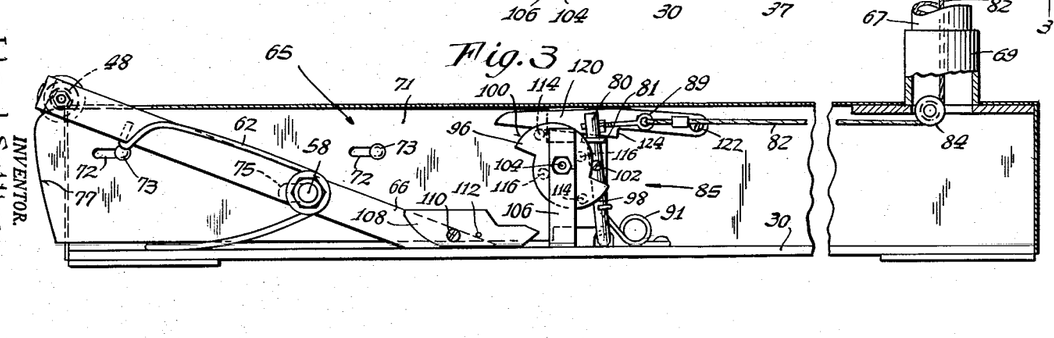
FIG. 3 is a fragmentary side elevational view of the barrier device, looking in the direction of the arrows 3, 3 of FIG. 2.
Figure 4:
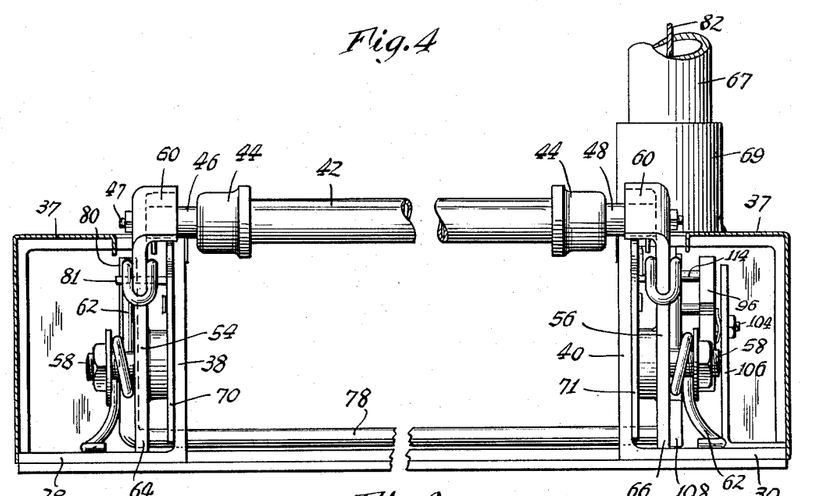
FIG. 4 is a fragmentary front elevational view of the vehicle parking barrier device.

The construction and operation of the coin-controlled barrier 26 as illustrated in FIGS. 2, 3 and 4 will first be considered. As seen in these figures, the barrier device is shown as constituted of a rectangular framework or base comprising side members 28 and 30 joined together by low front, intermediate and rear struts 32, 34 and 36. The struts 32, 34 and 36 may be in the form of heavy metal strips adapted to rest on the roadway or driveway, this same being true of the side members 28, 30. However, it is preferred to make the side members 28 and 30 in the form of angle iron structures whereby upstanding flanges 38 and 40 are provided, on which the operable parts of the barrier mechanism may be conveniently mounted.

Suitable elongate rectangular housings 37 may be provided, to constitute enclosures over the side base members 28 and 30, so as to encase the operating mechanisms associated therewith. The housings 37 may be constituted in any suitable manner, as from sheet metal, reinforced molded plastic or the like.

A principal part of the barrier mechanism comprises a horizontal barrier bar 42 which may be constituted as a thick-walled, sturdy pipe or tube, having end fittings 44 and spacer rollers 46 and 48 together with a through shaft or rod 47 on which the barrier bar 42 is mounted. The shaft 47 may have threaded ends accommodating nuts, said threaded ends passing through and being secured to the front extremities of arms 50 and 52 of a pair of levers 54 and 56 respectively, which are pivotally carried by pivot studs 58 rigidly affixed to the upstanding flanges 38 and 40 of the side frame members or angle irons. The front ends of the lever arms 50, 52 may be bent inwardly as indicated at 60, to constitute a guard and provide a finished edge surface.

Normally the barrier bar 42 is carried in a raised position as shown in the figures, and this is effected by means of two wire springs 62 coiled about the pivot studs 58 and engaging the front lever arms 50 and 52 on the one hand, and the base members 28 and 30 on the other hand.

The levers 54 and 56 have rear arms 64 and 66 respectively, which are adapted to engage the side base members 28 and 30 when the barrier bar 42 is in the raised position shown in FIGS. 2, 3 and 4.

By the above construction, the wheels of one side of a vehicle may pass between the side frame members 28 and 30 and over the barrier bar 42 one after the other, depressing the barrier bar as permitted by the pivotal mountings thereof comprising the levers 54, 56. The wire springs 62 will normally return the barrier bar 42 to the raised position shown whenever a depressing force is not present on such bar.

According to the present invention a novel and effective control structure is provided for connection with the horizontal barrier bar 42 and levers 54, and 56, by which a selective control of the movements of the barrier bar is had in response to operation of a coin-controlled mechanism. The coin operated control device comprises essentially two distinct assemblies, firstly a mechanical control assembly 65 which is directly cooperable with the bar 42 and levers 54, 56 and is located at the base plate 30, being mounted on the upstanding flange 40 thereof within the casing 37 and secondly a coin receiving assemblage 68 disposed at a remote point, such coin receiving assemblage being, in the illustrated embodiment of the invention, carried at the top of an upright stanchion 67 which is mounted on a bracket 69 carried at the rear extremity of the side base member 30 and associated housing 37.

By the invention, the horizontal locking bar 42 is normally locked and retained in the raised position shown by a mechanical, releasable locking means constituting part of the control assembly 65 and comprising a pair of slidably mounted locking or slide bars 70 and 71, such bars being provided with slots 72 receiving rivets or mounting pins 73 rigidly affixed to the upright flanges 38 and 40 whereby the bars 70, 71 are slidable along the outer sides of such flanges. The locking bars 70, 71 have clearance slots 75 through which the lever-mounting pivot studs 58 pass, and have sloping, rounded front edges 77 constituting camming means whereby the bars, when spring-biased forward, will be cammed backward by the roller sleeves 46, 48 during raising movement of the locking bar 42 from the lowered releasing position to the raised locking position shown in FIGS. 2, 3 and 4.

The slide bars 70, 71 are interconnected for simultaneous movement by a transverse connecting rod 78 having upstanding end portions 80 by which it has a U-formation. The slide bars 70, 71 have out-turned apertured lugs 81, through which the rod ends 80 extend and by which connection is made between the slide bars and the connecting rod 78 to effect the simultaneous movement of the locking bars.

The cable 82 is connected to an eye-bolt 89 which is screwed into one upright end 80 of the connecting rod 78 whereby a pull on the cable 82 to move the same will effect clockwise turning of the connecting rod 78 as viewed in FIG. 3, causing retracting movement of the locking slide bars 70, 71. Coiled wire springs 91 secured to the side base members 28, 30 normally yieldably hold the locking slide bars 70, 71 in extended, locking positions as shown in FIGS. 2 and 3.

A link-type driving connection is provided between the coin-receiving assemblage 68 mounted atop the stanchion 67 and the mechanical control assembly which is cooperable with the levers 54, 56, such linkage being preferably of a simple type comprising a flexible metal cable 82 passing over a direction-changing pulley 84 located in the support bracket 69.

In the appended claims and hereafter, the bars 70, 71 are referred to as a "releasable locking means"; also the remainder of the said control device 65 (indicated generally by the numeral 85) and the cable 82 with the coin-receiving assemblage 68 disposed atop the stanchion 67 are termed respectively an "actuatable means for rendering the locking bars 70, 71 inoperative" and a "semi-automatic means adapted for operation after actuation of said actuatable means, for rendering operative the locking means (70, 71) only in response to a predetermined successive lowering-and-raising movement of the locking bar."

The semi-automatic means 85 which renders operative the locking means only in response to a predetermined successive lowering and raising movement of the locking bar will first be described.

The assemblage 85 comprises a rotary control member 96 having a pair of identical cam edges 98 and 100 which are adapted to engage a cam follower pin 102 carried by one upstanding end 80 of the connecting rod 78. The rotary cam member 96 is carried by a pivot bolt 104 secured to an upright angle bracket 106 which is affixed to the side base member 30. When the rotary cam member 96 is turned clockwise as seen in FIG. 3, it will twice in each revolution effect a retracting right-to-left movement of the slide bars 70, 71, and during the retraction of such slide bars, the horizontal locking bar 42 will be free for downward movement, as for the purpose of enabling an automobile to pass, such downward movement being effected by the wheels of the vehicle in engaging the locking bar.

Further, in accordance with the invention, the downward movement of the locking bar as above mentioned is arranged to effect a rotation of the rotary cam member 96 through approximately one quarter revolution or 90°. This is accomplished by a pawl and ratchet arrangement comprising a pawl 108 pivotally carried by a screw 110 on the lever arm 66, such pawl having a positioning pin 112 engaging the arm 66 as shown in FIGS. 2 and 3 whereby clockwise turning of the pawl is restricted to the position shown in FIG. 3.

The rotary cam member 96 has pairs of ratchet pins 114 and 116 disposed adjacent the camming edges 98 and 100, the pins 116 being disposed closer to the pivot bolt 104 than the pins 114 as clearly shown. The ratchet pins 114, 116 are engageable by the pawl 108 during the downward movement of the locking bar 42, which is accompanied by a raising swinging movement of the lever arm 66, as will be understood. When the rotary cam member 96 is in the position shown in FIG. 3 it enables the locking bars 70, 71 to be in their extended, operative positions as shown. However, if such locking bars should be retracted, as by a pulling movement of the cable 82, thereby to release the wheel locking bar 42, an automobile wheel acting on the locking bar 42 may readily force it downward, thereby permitting the wheel to pass over and beyond the locking bar 42 and permitting departure of the vehicle.

This downward movement of the locking bar 42 will effect a quarter turn advance of the cam member 96 whereby the high spot of one of the cam edges 98, 100, will, by its engagement with the cam follower pin 102, retain the slide bars 70, 71 in their retracted positions. Accordingly, the locking bar 42 after now rising upon the first (front) vehicle wheel leaving it, may be thereafter again depressed, this time by the succeeding or rear wheel of the vehicle during the departure of the same. The second depressing movement of the locking bar 42 will effect a second quarter-turn advance of the rotary cam member 96 whereby there is now presented to the cam follower pin 102 the low portion of the next or succeeding cam edge 100.

During the first raising movement of the locking bar 42 after the front wheel has left it, the pawl 108 will have swung counterclockwise with respect to the lever arm 66 carrying it, thereby to enable it to bypass the next or succeeding ratchet pin, which will now become engaged during the next depressing movement of the locking bar. By this action the slide bars 70, 71 after release by the cable 82 and subsequent release by the cam member 96 upon the second wheel passing over the bar 42 will no longer be blocked and prevented from extending under the action of the coil springs 91 except by the presence of the depressed bar 42 as the second wheel rides thereover. When the bar 42 raises a second time, therefore, the slide bars 70, 71 will shift to extended positions. Accordingly, after the second or rear vehicle wheel has left the depressed locking bar 42 the latter will be immediately returned to the raised locking position under the action of the return springs 62, such movement being accompanied by a slight retraction of the slide bars as the camming edges or nose portions 77 of the bars are engaged with the roller sleeves 46, 48 in these passing upward over such nose portions. Upon the locking bar 42 attaining its raised position the second time, the slide bars 70, 71 will now become fully extended as aforesaid and shown in FIG. 3, whereupon the locking bar 42 will be prevented from any further depressing movement even though subjected to an appreciable force, since the slide bars are stoutly constructed and will resist all normal operating forces applied to the locking bar.

It will be noted that the new, advanced position of the rotary cam member 96 will differ from the original position shown in the figures by virtue of a rotation of 180°, and since the rotary cam member is made up of two identical halves, the action of such member when the second cam is operative at any later time will be the same as already described above. Accordingly it is seen from the foregoing description of the operation of the automatic control means, that it only remains for the slide bars 70, 71 to be initially retracted and temporarily held in retracted position, in order to enable a vehicle to depart from the parking area by virtue of the front and rear wheels of the vehicle encountering, depressing and passing over the locking bar 42.

Whereas an initial retraction of the slide bars 70, 71 may be effected by a suitable pulling force on the cable 82, the maintaining of such retraction is effected automatically, in accordance with the present invention, by a latch means constituting part of the device 85 and comprising a pivoted latch arm 120 carried by a pivot screw 122 secured to the upstanding flange 40 of the side base member 30. The latch arm 120 has a shoulder 124 which is engageable with the out-turned apertured lug 81 of the slide bar 71 when the two slide bars are retracted, as by a pull on the cable 82. Accordingly, a retention of the retracted position of the slide bars is effected automatically once the cable 82 has been pulled and moved a sufficient maximum distance. Therefore the locking bar 42 is unlocked, in readiness for a car wheel to depress it.

The first depressing movement of the locking bar 42 as effected by the front wheel of the vehicle, for instance, effecting approximately a 90° rotation of the rotary cam member 96, will cause the latch arm 120 to be rendered inoperative by virtue of engagement of one of the pair of widely separated ratchet pins 114 with the latch arm, effecting a raising movement of the latter whereby the apertured lug 81 is disengaged from the shoulder 124. Thereafter, the latch arm 120 remains inoperative until maximum retraction of the slide bars 70, 71 is again effected by a suitable pull on the cable 88. However, this first depressing movement of the locking bar 42 will bring a high spot of the cam 96 in engagement with the pin 102 whereby the slide bars 70, 71 cannot advance when released by the arm 120, except for just a very small distance which enables the active edge of the lug 81 to move just past the shoulder 124.

The extent of retention of the slide bars 70, 71 as thus effected by the high spots of the cam edges 98, 100 is now seen to be just insufficient to maintain the active edge of the apertured lug 81 of the slide bar 71 in a location at the detent shoulder 124 of the latch arm 120 where such shoulder could be effective. In other words, the retention of the slide bars as effected by the rotary cam member 96 will not enable the latch arm 120 to remain operative for retaining the slide bars in retracted position. Therefore, upon completion of the two successive depressing and raising movements of the locking bar 42 (as occasioned by the front and rear wheels of the vehicle passing over the said locking bar during departure of the vehicle) the latch arm 120 cannot be operative to retain the slide bars in retracted position, and such bars will ultimately be again extended whereby the locking bar 42 becomes locked after the second successive lowering and raising movement.

Figure 5:
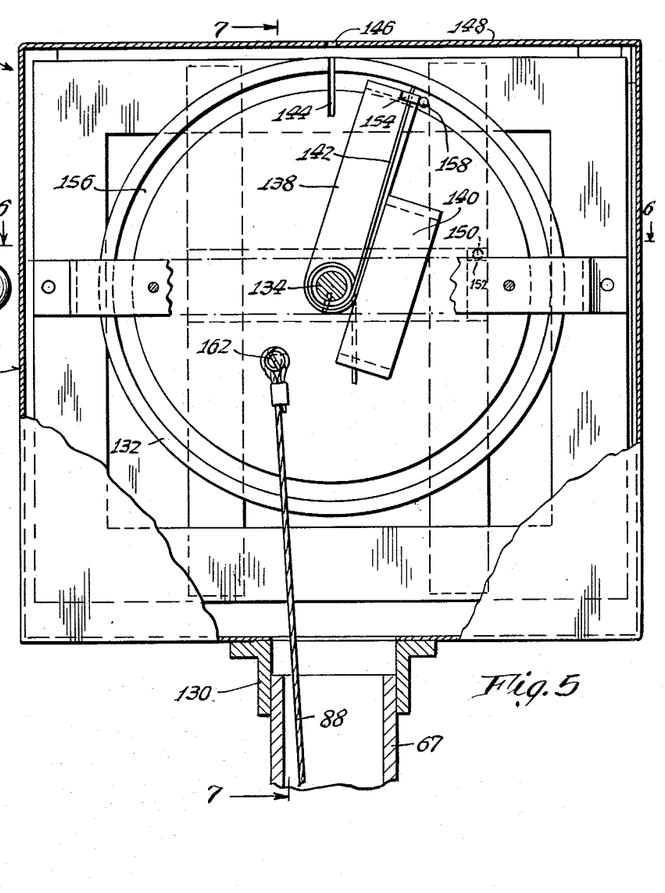
FIG. 5 is a view partly in front elevation and partly in vertical section, of a manually operable coin-controlled means constituting part of the barrier device of FIGS. 2, 3, and 4.
Figure 6:
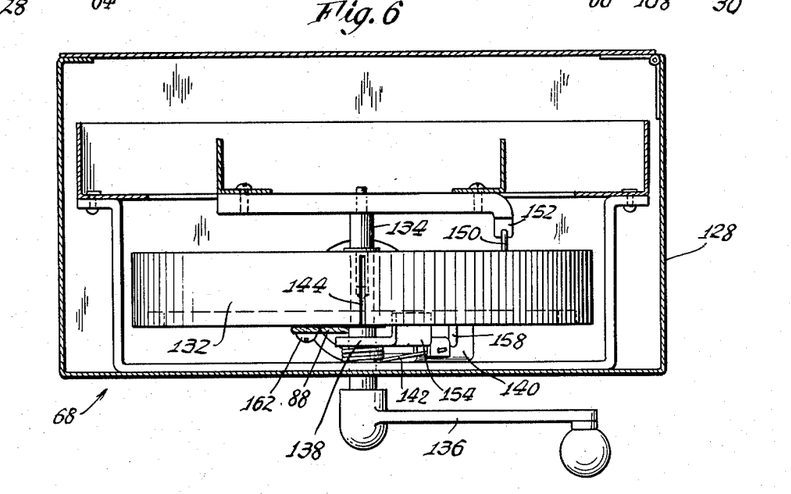
FIG. 6 is a horizontal section of the coin-controlled device of FIG. 5, taken on the line 6—6 of this previous figure.
Figure 7:
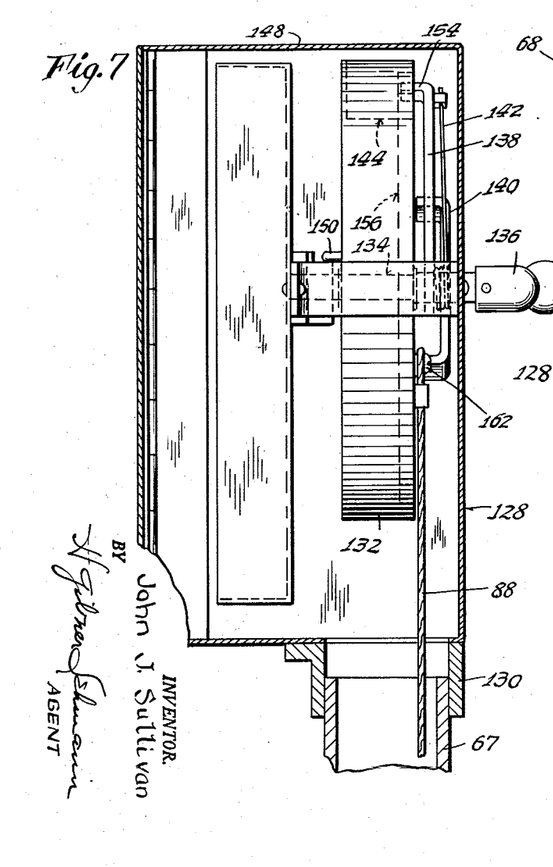
FIG. 7 is a vertical section, taken on the line 7—7 of FIG. 5.
Figures 8, 9, 10:
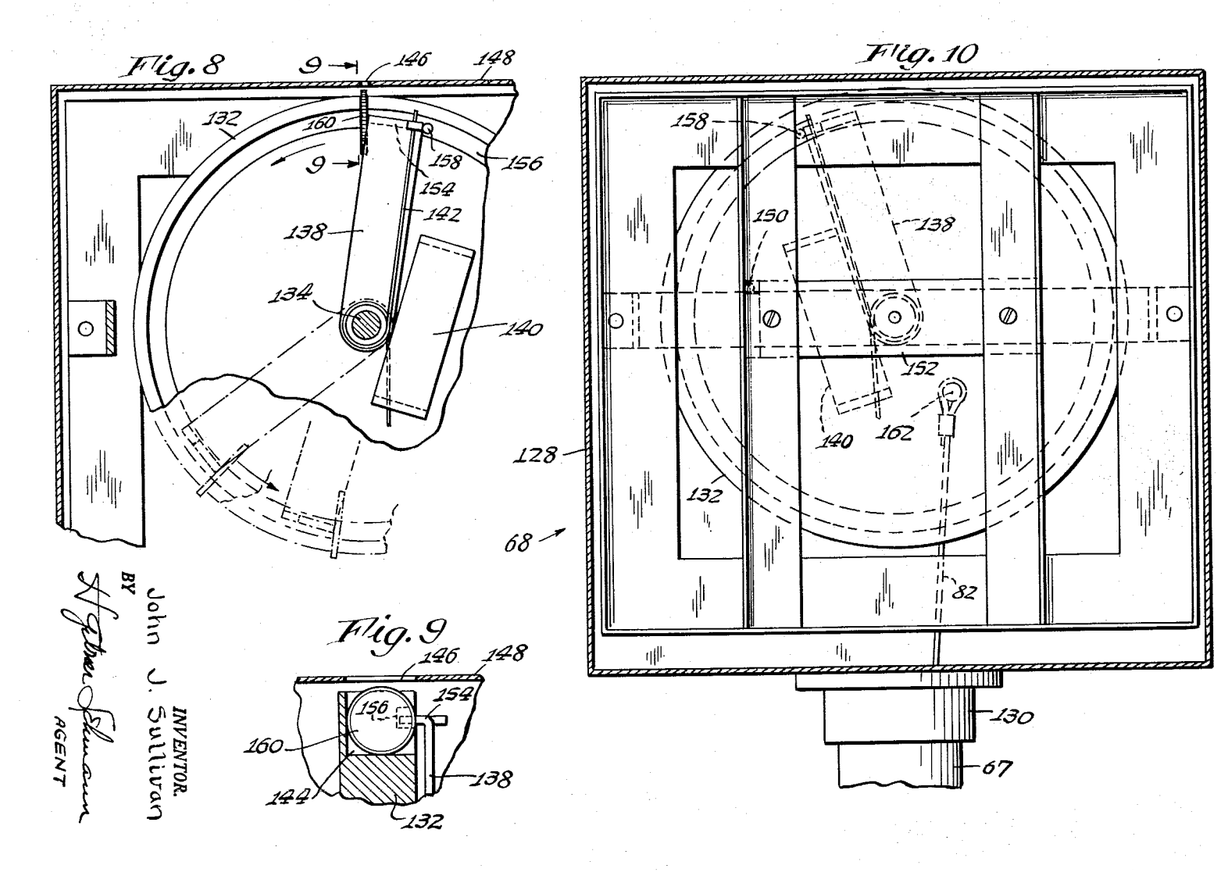
FIG. 8 is a fragmentary view showing a detail of the coin-controlled mechanism, illustrating the action of the coin wheel.
FIG. 9 is a fragmentary sectional view, taken on the line 9—9 of FIG. 8.
FIG. 10 is a rear view of the coin-controlled device, the casing thereof being shown in vertical section.

The coin-actuated assemblage 68 which is mounted atop the stanchion 67 comprises a casing 128 carried by a fitting 130 which mounts on the stanchion 67, as shown in FIG. 5. Within the casing 128 there is a rotary coin wheel 132 freely carried by a shaft 134 which has suitable bearings and which passes through the front of the casing, carrying an operating handle 136. Within the casing 128 the shaft has affixed to it a driving arm 138 engageable with a back stop 140 (which may be fixedly carried by the casing 128), said arm being biased clockwise as seen in FIG. 5 by a wire spring 142. Thus, the arm 138 is held against the stop 140, and the handle 136 is normally retained in a horizontal position as indicated in FIGS. 6 and 7.

The coin wheel 132 has a coin-receiving slot or notch 144, which is normally disposed below or beneath a coin slot 146 arranged in the top wall 148 of the casing 128. The coin wheel has a projecting pin 150, which is engageable with a stop or abutment 152 fixedly mounted within the casing 128, whereby the coin slot 144 or notch may be accurately positioned below the slot 146. The driving arm 138 has at its extremity a lateral projection 154 which is disposed in an annular slot or groove 156 provided in the front face of the coin wheel, and a stop pin 158 on the wheel is engageable with the projection 154, whereby the wheel is normally retained in the starting or coin-receiving position shown in the figures, as determined by the stop pin 150, the driving arm 138 and the return spring 142. When a coin 160 is placed in the coin slot 146 it will be deposited in the slot 144 of the coin wheel, thereby providing an obstruction for the driving arm 138. In consequence, counterclockwise turning of the handle 136 as viewed from the front of the casing 128 will cause the coin to effect a driving connection, whereby the coin wheel 132 will turn counterclockwise with the handle 136. The coin wheel has an eccentric pin 162, to which the cable 82 is secured. Thus, upon the above described counterclockwise turning movement of the handle 136 and the coin wheel 132, the cable 82 will be pulled, thereby to effect a full retraction of the slide bars 70, 71 to an extent sufficient to enable such slide bars to be retained in the retracted positions by the latch arm 120.

This counterclockwise turning movement of the coin wheel 132 is effected by the operator, after he has first deposited a coin 160 in the slot 146. Upon the operator releasing the handle 136, this latter will return, together with the coin wheel 132, to the starting position shown in the figures. However, at the termination of counterclockwise driving movement of the handle 136 the coin 160 will drop out of the slot 144 and into the bottom of the casing, thereby emptying the slot for the next coin to be deposited.

Accordingly, it will be seen from the foregoing that the departure of the automobile which has parked must be effected by the operator first depositing the required coin 160 in the coin slot 146, and thereafter turning the handle 136 fully counterclockwise, to effect release of the locking bar 42. Such action will deposit the coin 160 in the bottom of the casing 128, and will effect a pulling movement of the cable 82 which fully retracts the slide bars 70, 71, these being now held in retracted position by the latch arm 120. When the vehicle is driven out of the parking lot, the front and rear wheels will successively depress the locking bar 42. The first depressing movement will advance the cam rotary member 96 through approximately 90°, which will raise the latch cam 120 and at the same time retain the released slide bars 70, 71 in retracted positions which are not quite as far back as the positions effected by pull of the cable 82 and maintained by the latch arm 120. The second depressing movement of the locking bar 42 will effect a second 90° advance of the rotary cam member 96 whereupon, when the locking bar 42 raises a second time, the low part of a cam edge of the member 96 will be presented to the cam follower pin 102, thereby enabling the slide bars 70, 71 to be again fully extended whereby they lock the locking bar 42 in its final raised position. The pivotal mounting of the pawl 108 enables it to bypass the ratchet pin 114, 116 during the raising movement of the locking bar 42, as already mentioned. The latch arm 120 will at the beginning of the operation be raised and rendered inoperative by one of the ratchet pins 114. Upon completion of the above the device is then in readiness for the next departing vehicle.

Figure 11:
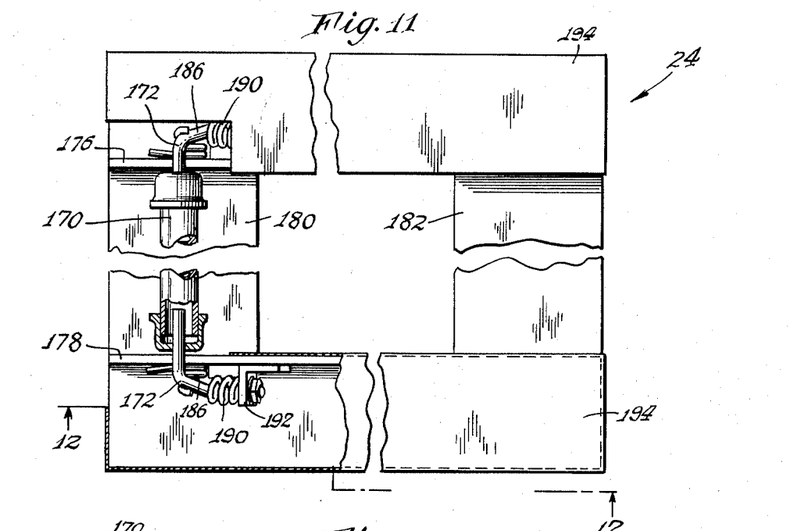
FIG. 11 is a compressed top plan view of the backcheck device provided by the invention, interconnecting portions being omitted for the sake of clarity of illustration.
Figure 12:
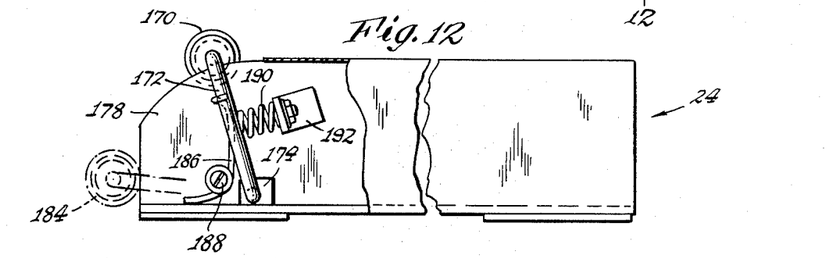
FIG. 12 is a side elevational view of the backcheck device of FIG. 11, looking in the direction of the arrows 12, 12.
Figure 13:
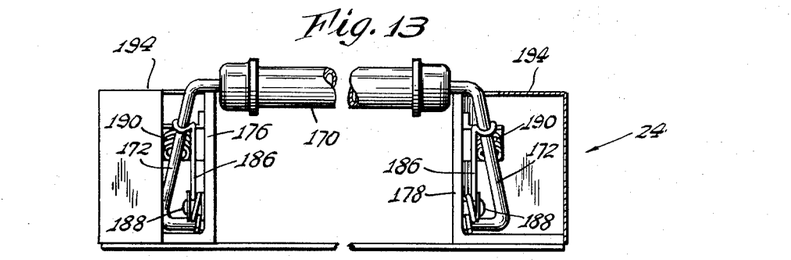
FIG. 13 is a compressed front elevational view of the backcheck device of FIGS. 11 and 12.

The backcheck mechanism provided by the invention, as illustrated in FIGS. 11, 12 and 13 comprises a horizontal backcheck bar 170 which is carried by heavy angle-shaped arms 172 pivotal about bearing blocks 174 secured to side base members 176 and 178 in the form of angle irons. The side base members 176 and 178 are secured together in spaced relation by flat strip-like tie members 180 and 182. The backcheck bar 170 may be swung downward from the raised position shown in the figures to a lowered position indicated by the broken outline labelled 184 in FIG. 12. The bar 170 is yieldably held in the raised position by two wire springs 186 carried by bolts 188 affixed to the side frame members 176 and 178. Shock-absorbing bumpers comprising helical compression coil springs 190 carried by brackets 192 are arranged for engagement with the mounting angle-shaped members 172, to lessen the effect of impact when a wheel after pasing over the backcheck bar 170 and depressing the same, releases the bar and the latter is impelled upward after the action of the wire springs 186. Suitable housings 194 are provided, to cover and enclose the side frame members 176 and 178 and the associated mechanism.

It will now be seen from the foregoing, that, in accordance with the present invention, I have provided a novel and improved, greatly simplified and effective parking meter system embracing a backcheck device at the entrance driveway of the parking or drive area, and a coin-controlled barrier device disposed at the outlet or exit driveway of the parking or driving area. The construction of the backcheck and barrier devices is extremely simple, involving relatively few components which may be economically fabricated and produced, and the mode of operation is such that faults or malfunctioning of the mechanism is not likely to occur, and servicing is held to a minimum. The mechanical movements are simple, straight-forward, and foolproof, and the various components may be sturdily fabricated thereby to withstand considerable usage and have a long and useful life.

Variations and modifications may be made within the scope of the claims, and portions of the improvements may be used without others.

I claim:

1. A releasable barrier device for automobiles, comprising a locking bar; means mounting said bar horizontally for reciprocative movement between a raised locking position and a lowered releasing position; releasable locking means for retaining said bar in raised position, said means comprising a track adapted to extend horizontally along the ground, and comprising a slide bar supported on the track and movable under the locking bar to positively block downward movement of the same and to directly bear, by solely compressive stresses reacting on the track, all downward forces applied to the locking bar; actuatable means for rendering said locking means inoperative; and semi-automatic means actuated by the locking bar and adapted for operation after actuation of said immediately preceding means for rendering operative the locking means only in response to a predetermined successive complete lowering-and-raising movement of the locking bar.

2. The invention as defined in claim 2 in which the locking means comprises an additional slide bar, said two slide bars being engageable with end portions of the locking bar, and in which there is a turnable connector bar joining the slide bars to effect simultaneous movements thereof.

3. A barrier device as in claim 2 in which the semi-automatic means comprises a cam device having a plurality of cam edges, and a cam follower engageable with the cam device and connected with the locking means, and in which the locking slide bar is controlled by the cam follower and prevented from having locking movement thereby.

4. A barrier device as in claim 2, in which said actuatable means is drivingly connected to the slide bar and comprises a manually operable handle and coin-controlled means connected with said handle, the latter having a driving connection with said locking means.

5. The invention as defined in claim 4, in which there is a coin wheel having a peripheral slot to receive a coin, in which there is a lug connected with the handle and engageable with a coin in said slot of the wheel to effect driving engagement with the wheel, and in which the driving connection includes a cable affixed to the said wheel.

6. The invention as defined in claim 1 in which the locking bar is carried by lever arms which constitute part of the said mounting means for the bar, and in which the said semi-automatic means comprises a rotary member operatively connected with one lever arm and engageable with the slide bar.

7. The invention as defined in claim 6 in which the semi-automatic means comprises a pawl pivotally mounted on the one lever arm and engageable with the said rotary member, and in which the rotary member has a pair of cam edges, and has pairs of pins engageable by the pawl to effect turning of the member, a pair of pins being juxtaposed to each of the cam edges and the pins of each pair being positioned at different distances from the axis of turning of the rotary member.

8. A releasable barrier device for automobiles, comprising a locking bar; means mounting said bar horizontally for reciprocative movement between a raised locking position and a lowered releasing position; releasable locking means for retaining said bar in raised position; actuatable means for rendering said locking means inoperative; and semi-automatic means adapted for operation after actuation of said immediately preceding means for rendering operative the locking means only in response to a predetermined successive lowering-and-raising movement of the locking bar; said locking means comprising a slide bar engageable with the locking bar to block downward movement of the latter, said actuatable means being drivingly connected to the slide bar, said locking bar being carried by lever arms which constitute part of the said mounting means for the bar, said semi-automatic means comprising a rotary member, operatively connected with one lever arm and engageable with the slide bar, comprising a pawl pivotally mounted on the one lever and engageable with the said rotary member, and comprising a latch means for releasably retaining the locking means inoperative in response to and after operation of said actuatable means, said latch means being made operative only by said actuatable means and the semi-automatic means when operated rendering the latch means inoperative, said rotary member having pins engageable by the pawl to effect turning of the member, said pins being engageable with the latch means to render the same inoperative.

9. The invention as defined in claim 8, in which the rotary member has a pair of cam edges, a pair of pins being juxtaposed to each of the cam edges and the pins of each pair being positioned at different distances from the axis of the turning of the rotary member.

References Cited in the file of this patent

UNITED STATES PATENTS

| 1,677,938 | Van Sickle | July 24, 1928 |
|-----------|------------|---------------|
| 1,726,724 | Warren | Sept. 3, 1929 |
| 2,200,639 | Rice | May 14, 1940 |
| 2,528,790 | Scherer | Nov. 7, 1950 |
| 2,588,502 | Dunn | Mar. 11, 1952 |
| 2,657,486 | Sweetser | Nov. 3, 1953 |
| 2,762,145 | Rupe | Sept. 11, 1956 |